(12) United States Patent
Ji et al.

(10) Patent No.: US 10,428,911 B2
(45) Date of Patent: Oct. 1, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Seongwook Ji, Gunpo-si (KR); Seong Wook Hwang, Gunpo-si (KR); Juhyeon Park, Suwon-si (KR); Wonmin Cho, Hwaseong-si (KR); Hyun Sik Kwon, Seoul (KR); Ilhan Yoo, Seongnam-si (KR); Jae Chang Kook, Hwaseong-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 15/816,113

(22) Filed: Nov. 17, 2017

(65) Prior Publication Data
US 2019/0120341 A1    Apr. 25, 2019

(30) Foreign Application Priority Data

Oct. 19, 2017    (KR) .................. 10-2017-0135808

(51) Int. Cl.
*F16H 3/66*    (2006.01)
(52) U.S. Cl.
CPC ..... *F16H 3/666* (2013.01); *F16H 2200/0069* (2013.01); *F16H 2200/0078* (2013.01); *F16H 2200/2012* (2013.01); *F16H 2200/2015* (2013.01); *F16H 2200/2046* (2013.01)

(58) Field of Classification Search
CPC ............ F16H 3/666; F16H 2200/0078; F16H 2200/2012; F16H 2200/0069; F16H 2200/2046; F16H 2200/2015
See application file for complete search history.

(56) References Cited

U.S. PATENT DOCUMENTS

| 7,377,872 | B2 * | 5/2008 | Jang ........................ | F16H 3/663 |
| | | | | 475/275 |
| 7,384,364 | B2 * | 6/2008 | Jang ........................ | F16H 3/663 |
| | | | | 475/275 |
| 8,647,227 | B2 * | 2/2014 | Park ........................ | F16H 3/666 |
| | | | | 475/275 |
| 10,138,984 | B2 * | 11/2018 | Park ........................ | F16H 3/666 |

\* cited by examiner

*Primary Examiner* — Jacob S. Scott
*Assistant Examiner* — James J Taylor, II
(74) *Attorney, Agent, or Firm* — Morgan, Lewis & Bockius LLP (57) ABSTRACT

A planetary gear train may include input and output shafts, first to fourth planetary gear sets respectively having first to third, fourth to sixth, seventh to tenth, and eleventh to thirteenth elements, a first shaft connected to the second element and the input shaft, a second shaft connected to the twelfth element and the output shaft, a third shaft connected to the first and seventh elements, a fourth shaft connected to the eighth element, a fifth shaft connected to the ninth and eleventh element, a sixth shaft connected to the fifth and thirteenth elements, and a plurality of shafts each selectively connecting a corresponding element to a transmission housing, the corresponding element being an element of the first, second and third planetary gear sets which is not interconnected.

11 Claims, 3 Drawing Sheets

| Shift-stage | Engagement element | | | | | | Gear ratio |
|---|---|---|---|---|---|---|---|
| | C1 | C2 | C3 | B1 | B2 | B3 | |
| D1 | | | ● | | | ● | 4.190 |
| D2 | ● | | | ● | ● | ● | 2.716 |
| D3 | ● | | | ● | | ● | 2.072 |
| D4 | | ● | | | | ● | 1.553 |
| D5 | | ● | ● | | | ● | 1.210 |
| D6 | ● | ● | ● | | | | 1.000 |
| D7 | | ● | ● | | ● | | 0.779 |
| D8 | | ● | ● | ● | | | 0.621 |
| D9 | | ● | | ● | ● | | 0.505 |
| D10 | ● | ● | | | ● | | 0.419 |
| REV | | | ● | ● | | ● | -5.431 |

FIG. 3

| Shift-stage | Engagement element | | | | | | Gear ratio |
|---|---|---|---|---|---|---|---|
| | C1 | C2 | C3 | B1 | B2 | B3 | |
| D1 | | | ● | | ● | ● | 4.190 |
| D2 | ● | | | ● | ● | ● | 2.716 |
| D3 | ● | | | | ● | ● | 2.250 |
| D4 | ● | | | ● | | ● | 2.072 |
| D5 | ● | | ● | | | ● | 1.658 |
| D6 | ● | ● | | | | ● | 1.553 |
| D7 | | ● | ● | | | ● | 1.210 |
| D8 | ● | ● | ● | | | | 1.000 |
| D9 | | ● | ● | | ● | | 0.779 |
| D10 | | ● | ● | ● | | | 0.621 |
| D11 | | ● | | ● | ● | | 0.505 |
| D12 | ● | ● | | ● | | | 0.486 |
| D13 | ● | ● | | | ● | | 0.419 |
| D14 | | ● | | ● | | ● | 0.192 |
| REV | | | ● | ● | | ● | -5.431 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0135808 filed on Oct. 19, 2017, the entire contents of which is incorporated herein for all purposes by this reference.

BACKGROUND OF THE INVENTION

Field of the Invention

The present invention relates to a planetary gear train of an automatic transmission for a vehicle.

Description of Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In the present respect, an eight-speed automatic transmission has been recently introduced, and a planetary gear train for an automatic transmission facilitating more shift stages is under investigation.

An automatic transmission of eight or more shift-stages typically includes three to four planetary gear sets and five to seven engagement elements (frictional elements), and may easily become lengthy, deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least ten forward speeds, providing better performance and fuel efficiency of a vehicle.

A planetary gear train according to an exemplary embodiment of the present invention may include an input shaft receiving an engine torque, an output shaft outputting a shifted torque, a first planetary gear set having first, second and third rotation elements, a second planetary gear set having fourth, fifth, and sixth rotation elements, a third planetary gear set having seventh, eighth, ninth, and tenth rotation elements, and a fourth planetary gear set having eleventh, twelfth, and thirteenth rotation elements. An exemplary planetary gear train may further include a first shaft fixedly connected to the second rotation element and the input shaft, a second shaft fixedly connected to the twelfth rotation element and the output shaft, a third shaft fixedly connected to the first rotation element and the seventh rotation element, a fourth shaft fixedly connected to the eighth rotation element, a fifth shaft fixedly connected to the ninth rotation element and the eleventh rotation element, a sixth shaft fixedly connected to the fifth rotation element and the thirteenth rotation element, and a plurality of shafts each selectively connecting a corresponding element to the transmission housing, the corresponding element being a rotation element of the first, second and third planetary gear sets which is not fixedly interconnected.

The plurality of shafts may include a seventh shaft fixedly connected to the third rotation element and selectively connectable to the transmission housing, an eighth shaft fixedly connected to the fourth rotation element and the tenth rotation element and selectively connectable to the transmission housing, and a ninth shaft fixedly connected to the sixth rotation element, and selectively connectable to the transmission housing. The first shaft and the fifth shaft, the fifth shaft and the seventh shaft, and the fourth shaft and the sixth shaft may be selectively interconnected respectively.

The planetary gear train may further include three clutches each selectively connecting a corresponding pair among the input shaft, the output shaft, and the first to ninth shafts, and three brakes selectively connecting the seventh shaft, the eighth shaft, and the ninth shaft to the transmission housing respectively.

The three clutches may include a first clutch disposed between the first shaft and the fifth shaft, a second clutch disposed between the fifth shaft and the seventh shaft, and a third clutch disposed between the fourth shaft and the sixth shaft. The three brakes may include a first brake disposed between the seventh shaft and the transmission housing, a second brake disposed between the eighth shaft and the transmission housing, and a third brake disposed between the ninth shaft and the transmission housing.

The first planetary gear set may be a single pinion planetary gear set having a first sun gear, a first planet carrier, and a first ring gear as the first, second and third rotation elements. The second planetary gear set may be a single pinion planetary gear set having a second sun gear, a second planet carrier, and a second ring gear as the fourth, fifth, and sixth rotation elements. The third planetary gear set may be a compound planetary gear set having a first split sun gear, a second split sun gear, a third planet carrier, and a third ring gear as t the seventh, eighth, ninth, and tenth rotation elements. The fourth planetary gear set is a single pinion planetary gear set having a fourth sun gear, a fourth planet carrier, and a fourth ring gear as the eleventh, twelfth, and thirteenth rotation elements.

The first, second, third and fourth planetary gear sets may be disposed in the order of the first, third, second, and fourth planetary gear sets from an engine side.

A planetary gear train according to an exemplary embodiment of the present invention may realize at least ten forward speeds one reverse speed by combination of three simple planetary gear sets and one compound planetary gear set together with six engagement elements.

Furthermore, a planetary gear train according to an exemplary embodiment of the present invention may improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

Figure 1:
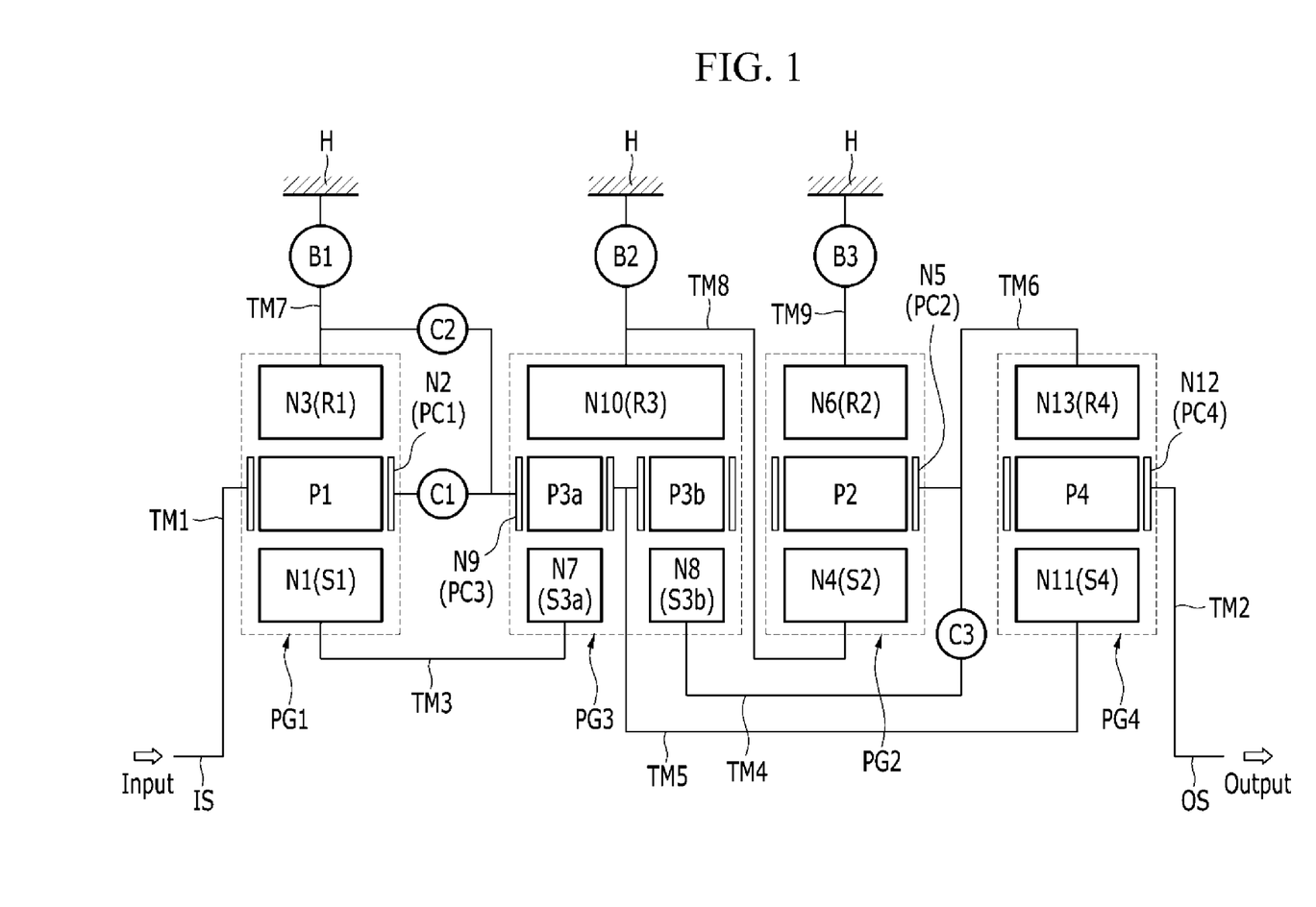
FIG. 1 is a schematic diagram of a planetary gear train according to an exemplary embodiment of the present invention.

FIG. 1 is a schematic diagram of a planetary gear train according to an exemplary embodiment of the present invention.

Referring to FIG. 1, a planetary gear train according to an exemplary embodiment of the present invention may include first, second, third and fourth planetary gear sets PG1, PG2, PG3, and PG4 disposed on a same axis, an input shaft IS, an output shaft OS, nine shafts TM1 to TM9 interconnecting rotation elements of the first, second, third and fourth planetary gear sets PG1, PG2, PG3, and PG4, engagement elements of three clutches C1 to C3 and three brakes B1 to B3, and a transmission housing H.

Torque input from the input shaft IS is shifted by cooperative operation of the first, second, third and fourth planetary gear sets PG1, PG2, PG3, and PG4, and then output through the output shaft OS.

The planetary gear sets are disposed in the order of first, third, second, and fourth planetary gear sets PG1, PG3, PG2, and PG4, from an engine side.

The input shaft IS is an input member and may receive a torque from a crankshaft of an engine through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and may include a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and may include a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2 engaged with the second sun gear S2. The second sun gear S2 acts as a fourth rotation element N4, the second planet carrier PC2 acts as a fifth rotation element N5, and the second ring gear R2 acts as a sixth rotation element N6.

The third planetary gear set PG3 is a compound planetary gear set having a common ring gear and a common planet carrier, and two split sun gears.

As a result, the third planetary gear set PG3 forms four rotation elements of a planet carrier, a ring gear, and two sun gears. In more detail, the third planetary gear set PG3 may include a first split sun gear S3a, a second split sun gear S3b, a third planet carrier PC3 rotatably supporting a plurality of first and second split pinion gears P3a and P3b externally gear-meshed with the first and second split sun gears S3a and S3b, and a third ring gear R3 internally gear-meshed with the plurality of first and second split pinion gears P3a and P3b. The first split sun gear S3a acts as a seventh rotation element N7. The second split sun gear S3b acts as an eighth rotation element N8. The third planet carrier PC3 acts as a ninth rotation element N9. The third ring gear R3 acts as a tenth rotation element N10.

The fourth planetary gear set PG4 is a single pinion planetary gear set, and may include a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as an eleventh rotation element N11. The fourth planet carrier PC4 acts as a twelfth rotation element N12. The fourth ring gear R4 acts as a thirteenth rotation element N13.

In the first, second, third and fourth planetary gear sets PG1, PG2, PG3, and PG4, the first rotation element N1 and the seventh rotation element N7 are fixedly interconnected, the fourth rotation element N4 and the tenth rotation element N10 are fixedly interconnected, the fifth rotation element N5 and the thirteenth rotation element N13 are fixedly interconnected, the ninth rotation element N9 and the eleventh rotation element N11 are fixedly interconnected, and nine shafts TM1 to TM9 are formed.

The nine shafts TM1 to TM9 are hereinafter described more specifically.

The first shaft TM1 is fixedly connected to the second rotation element N2 (first planet carrier PC1), and fixedly connected to the input shaft IS, always acting as an input element.

The second shaft TM2 is fixedly connected to the twelfth rotation element N12 (fourth planet carrier PC4), and fixedly connected to the output shaft OS always acting as an output element.

The third shaft TM3 is fixedly connected to the first rotation element N1 (first sun gear S1) and the seventh rotation element N7 (the first split sun gear S3a).

The fourth shaft TM4 is fixedly connected to the eighth rotation element N8 (second split sun gear S3b).

The fifth shaft TM5 is fixedly connected to ninth rotation element N9 (third planet carrier PC3) and eleventh rotation element N11 (fourth sun gear S4).

The sixth shaft TM6 is fixedly connected to fifth rotation element N5 (second planet carrier PC2) and thirteenth rotation element N13 (fourth ring gear R4).

The seventh shaft TM7 is fixedly connected to the third rotation element N3 (first ring gear R1).

The eighth shaft TM8 is fixedly connected to fourth rotation element N4 (second sun gear S2) and tenth rotation element N10 (third ring gear R3).

The ninth shaft TM8 is fixedly connected to the sixth rotation element N6 (second ring gear R2).

Each of the nine shafts TM1 to TM9 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first shaft TM1 is selectively connectable to the fifth shaft TM5, the fifth shaft TM5 is selectively connectable to the seventh shaft TM7, and the fourth shaft TM4 is selectively connectable to the sixth shaft TM6.

Furthermore, the seventh shaft TM7, the eighth shaft TM8, and ninth shaft TM9 are selectively connectable to the transmission housing H, selectively acting as fixed elements respectively.

Engagement elements of three clutches C1, C2, and C3 are disposed between the nine shafts TM1 to TM9, the input shaft IS, and the output shaft OS, to form selective connections.

Engagement elements of three brakes B1, B2, and B3 are disposed for selectively connecting corresponding shafts among the nine shafts TM1 to TM9 to the transmission housing H.

The first clutch C1 is disposed between the first shaft TM1 and the fifth shaft TM5, and selectively connects the first shaft TM1 and the fifth shaft TM5, controlling power delivery therebetween.

The second clutch C2 is disposed between the fifth shaft TM5 and the seventh shaft TM7, and selectively connects the fifth shaft TM5 and the seventh shaft TM7, controlling power delivery therebetween.

The third clutch C3 is disposed between the fourth shaft TM4 and the sixth shaft TM6, and selectively connects the fourth shaft TM4 and the sixth shaft TM6, controlling power delivery therebetween.

The first brake B1 is disposed between the seventh shaft TM7 and the transmission housing H, and selectively connects the seventh shaft TM7 to the transmission housing H.

The second brake B2 is disposed between the eighth shaft TM8 and the transmission housing H, and selectively connects the eighth shaft TM8 to the transmission housing H.

The third brake B3 is disposed between the ninth shaft TM9 and the transmission housing H, and selectively connects the ninth shaft TM9 to the transmission housing H.

The engagement elements of the first, second and third clutches C1, C2, and C3 and the first, second and third brakes B1, B2, and B3 may be realized as multi-plate hydraulic pressure friction devices that are frictionally engaged by hydraulic pressure, however, it should not be understood to be limited thereto, since various other configuration that are electrically controllable may be available.

Figure 2:
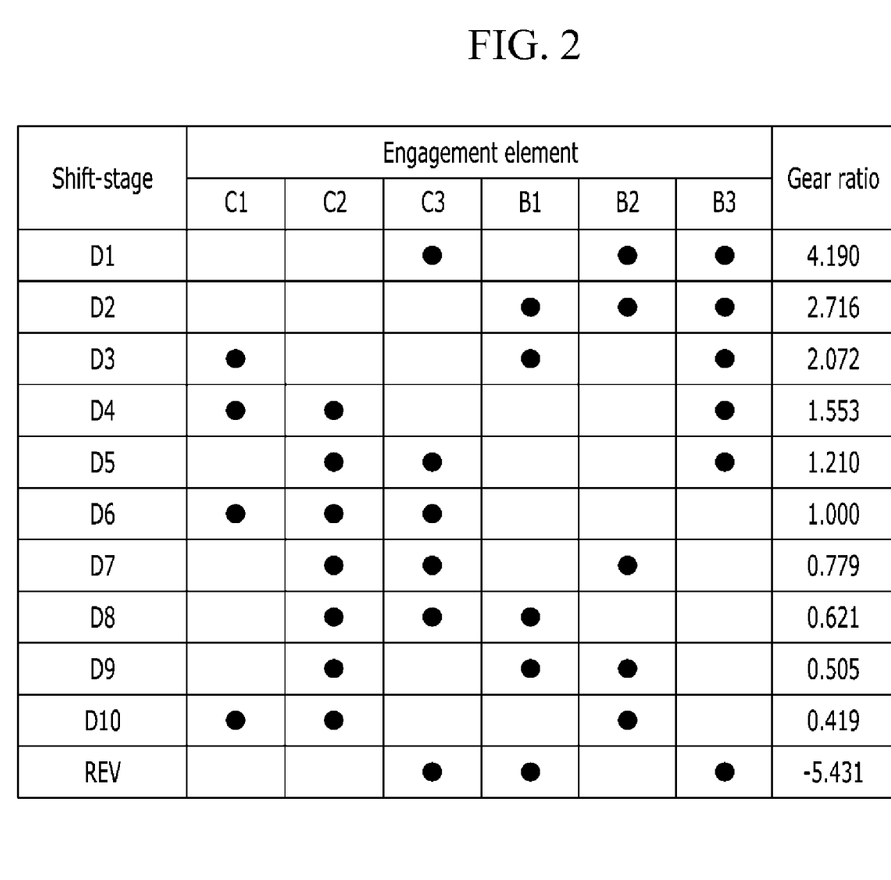
FIG. 2 is an operational chart for respective control elements at respective shift-stages applicable to a planetary gear train according to an exemplary embodiment that realizes ten forward speeds and one reverse speeds.

FIG. 2 is an operational chart for respective control elements at respective shift-stages applicable to a planetary gear train according to an exemplary embodiment that realizes ten forward speeds and one reverse speeds.

Referring to FIG. 2, a planetary gear train according to an exemplary embodiment of the present invention realizes shifting between ten forward speeds and one reverse speed by operating three elements among the engagement elements of the first, second and third clutches C1, C2, and C3 and the first, second and third brakes B1, B2, and B3.

In the first forward speed D1, the third clutch C3 and the second and third brakes B2 and B3 are simultaneously operated.

As a result, the fourth shaft TM4 and the sixth shaft TM6 are connected by the operation of the third clutch C3. In the present state, the torque of the input shaft IS is input to the first shaft TM1.

In such a state, the eighth shaft TM8 and the ninth shaft TM9 act as fixed elements by the operation of the second and third brakes B2 and B3, realizing the first forward speed by cooperative operation of respective shafts and outputting a shifted torque to the output shaft OS connected to the second shaft TM2.

In the second forward speed D2, the first and second, third brakes B1, B2, and B3 are simultaneously operated.

As a result, the torque of the input shaft IS is input to the first shaft TM1, and the seventh shaft TM7, the eighth shaft TM8, and ninth shaft TM9 act as fixed elements by the operation of the first, second and third brakes B1, B2, and B3, realizing the second forward speed by cooperative operation of respective shafts and outputting a shifted torque to the output shaft OS connected to the second shaft TM2.

In the third forward speed D3, the first clutch C1 and the first and third brakes B1 and B3 are simultaneously operated.

As a result, the first shaft TM1 and the fifth shaft TM5 are connected by the operation of the first clutch C1. In the present state, the torque of the input shaft IS is input to the first shaft TM1.

In such a state, the seventh shaft TM7 and the ninth shaft TM9 act as fixed elements by the operation of the first and third brakes B1 and B3, realizing the third forward speed by cooperative operation of respective shafts and outputting a shifted torque to the output shaft OS connected to the second shaft TM2.

In the fourth forward speed D4, the first and second clutch C1 and C2 and the third brake B3 are simultaneously operated.

As a result, the first shaft TM1 and the fifth shaft TM5 are connected by the operation of the first clutch C1, and the fifth shaft TM5 and the seventh shaft TM7 are connected by the operation of the second clutch C2. In the present state, the torque of the input shaft IS is input to the first shaft TM1.

In such a state, the ninth shaft TM9 acts as a fixed element by the operation of the third brake B3, realizing the fourth forward speed by cooperative operation of respective shafts and outputting a shifted torque to the output shaft OS connected to the second shaft TM2.

In the fifth forward speed D5, the second and third clutches C2 and C3 and the third brake B3 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the ninth shaft TM9 acts as a fixed element by the operation of the third brake B3, realizing the fifth forward speed by cooperative operation of respective shafts and outputting a shifted torque to the output shaft OS connected to the second shaft TM2.

In the sixth forward speed D6, the first, second and third clutches C1, C2, and C3 are simultaneously operated.

As a result, the first shaft TM1 and the fifth shaft TM5 are connected by the operation of the first clutch C1, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

As such, first, second, third and fourth planetary gear sets PG1, PG2, PG3, and PG4 integrally rotate, realizing the sixth forward speed where a torque is output as inputted and outputting a shifted torque to the output shaft OS connected to the second shaft TM2.

In the seventh forward speed D7, the second and third clutches C2 and C3 and the second brake B2 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the eighth shaft TM8 acts as a fixed element by the operation of the second brake B2, realizing the seventh forward speed by cooperative operation of respective shafts and outputting a shifted torque to the output shaft OS connected to the second shaft TM2.

In the eighth forward speed D8, the second and third clutches C2 and C3 and the first brake B1 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the seventh shaft TM7 acts as a fixed element by the operation of the first brake B1, realizing the eighth forward speed by cooperative operation of respective shafts and outputting a shifted torque to the output shaft OS connected to the second shaft TM2.

In the ninth forward speed D9, the second clutch C2 and the first and second brakes B1 and B2 are simultaneously operated.

As a result, the fifth shaft TM5 and the seventh shaft TM7 are connected by the operation of the second clutch C2. In the present state, the torque of the input shaft IS is input to the first shaft TM1.

In such a state, the seventh shaft TM7 and the eighth shaft TM8 act as fixed elements by the operation of the first and second brakes B1 and B2, realizing the ninth forward speed by cooperative operation of respective shafts and outputting a shifted torque to the output shaft OS connected to the second shaft TM2.

In the forward tenth speed D10, the first and second clutch C1 and C2 and the second brake B2 are simultaneously operated.

As a result, the first shaft TM1 and the fifth shaft TM5 are connected by the operation of the first clutch C1, and the fifth shaft TM5 and the seventh shaft TM7 are connected by the operation of the second clutch C2. In the present state, the torque of the input shaft IS is input to the first shaft TM1.

In such a state, the eighth shaft TM8 acts as a fixed element by the operation of the second brake B2, realizing the forward tenth speed by cooperative operation of respective shafts and outputting a shifted torque to the output shaft OS connected to the second shaft TM2.

In the reverse speed REV, the third clutch C3 and the first and third brakes B1 and B3 are simultaneously operated.

As a result, the fourth shaft TM4 and the sixth shaft TM6 are connected by the operation of the third clutch C3. In the present state, the torque of the input shaft IS is input to the first shaft TM1.

In such a state, the seventh shaft TM7 and the ninth shaft TM9 act as fixed elements by the operation of the first and third brakes B1 and B3, realizing the reverse speed by cooperative operation of respective shafts and outputting a reverse torque through the output shaft OS connected to the second shaft TM2.

Figure 3:
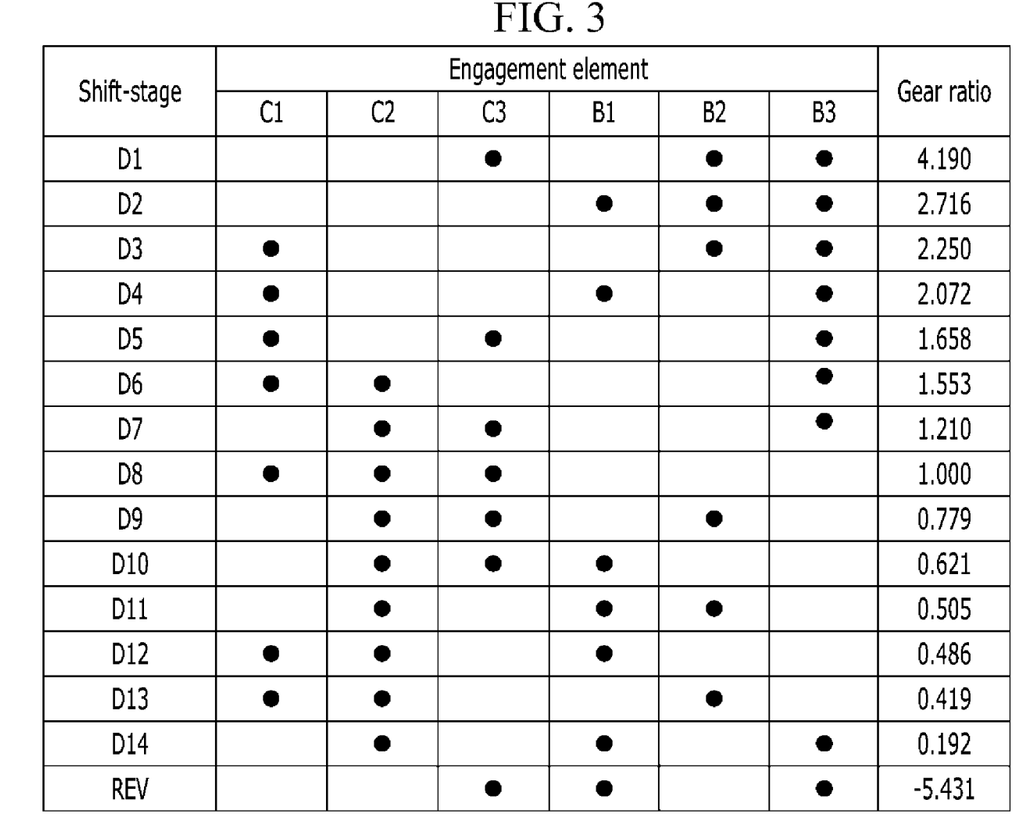
FIG. 3 is an operational chart for respective control elements at respective shift-stages applicable to a planetary gear train according to an exemplary embodiment that realizes fourteen forward speeds and one reverse speeds.

FIG. 3 is an operational chart for respective control elements at respective shift-stages applicable to a planetary gear train according to an exemplary embodiment that realizes fourteen forward speeds and one reverse speeds.

Referring to FIG. 3, a planetary gear train according to an exemplary embodiment of the present invention realizes shifting between fourteen forward speeds and one reverse speed by operating three elements among the engagement elements of the first, second and third clutches C1, C2, and C3 and the first, second and third brakes B1, B2, and B3.

In the first forward speed D1, the third clutch C3 and the second and third brakes B2 and B3 are simultaneously operated.

As a result, the fourth shaft TM4 and the sixth shaft TM6 are connected by the operation of the third clutch C3. In the present state, the torque of the input shaft IS is input to the first shaft TM1.

In such a state, the eighth shaft TM8 and the ninth shaft TM9 act as fixed elements by the operation of the second and third brakes B2 and B3, realizing the first forward speed by cooperative operation of respective shafts and outputting a shifted torque to the output shaft OS connected to the second shaft TM2.

In the second forward speed D2, the first and second, third brakes B1, B2, and B3 are simultaneously operated.

As a result, the torque of the input shaft IS is input to the first shaft TM1, and the seventh shaft TM7, the eighth shaft TM8, and ninth shaft TM9 act as fixed elements by the operation of the first, second and third brakes B1, B2, and B3, realizing the second forward speed by cooperative operation of respective shafts and outputting a shifted torque to the output shaft OS connected to the second shaft TM2.

In the third forward speed D3, the first clutch C1 and the second and third brakes B2 and B3 are simultaneously operated.

As a result, the first shaft TM1 and the fifth shaft TM5 are connected by the operation of the first clutch C1. In the present state, the torque of the input shaft IS is input to the first shaft TM1.

In such a state, the eighth shaft TM8 and the ninth shaft TM9 act as fixed elements by the operation of the second and third brakes B2 and B3, realizing the third forward speed by cooperative operation of respective shafts and outputting a shifted torque to the output shaft OS connected to the second shaft TM2.

In the fourth forward speed D4, the first clutch C1 and the first and third brakes B1 and B3 are simultaneously operated.

As a result, the first shaft TM1 and the fifth shaft TM5 are connected by the operation of the first clutch C1. In the present state, the torque of the input shaft IS is input to the first shaft TM1.

In such a state, the seventh shaft TM7 and the ninth shaft TM9 act as fixed elements by the operation of the first and third brakes B1 and B3, realizing the fourth forward speed by cooperative operation of respective shafts and outputting a shifted torque to the output shaft OS connected to the second shaft TM2.

In the fifth forward speed D5, the first and third clutches C1 and C3 and the third brake B3 are simultaneously operated.

As a result, the first shaft TM1 and the fifth shaft TM5 are connected by the operation of the first clutch C1, and the fourth shaft TM4 and the sixth shaft TM6 are connected by the operation of the third clutch C3. In the present state, the torque of the input shaft IS is input to the first shaft TM1.

In such a state, the ninth shaft TM9 acts as a fixed element by the operation of the third brake B3, realizing the fifth forward speed by cooperative operation of respective shafts and outputting a shifted torque to the output shaft OS connected to the second shaft TM2.

In the sixth forward speed D6, the first and second clutch C1 and C2 and the third brake B3 are simultaneously operated.

As a result, the first shaft TM1 and the fifth shaft TM5 are connected by the operation of the first clutch C1, and the fifth shaft TM5 and the seventh shaft TM7 are connected by the operation of the second clutch C2. In the present state, the torque of the input shaft IS is input to the first shaft TM1.

In such a state, the ninth shaft TM9 acts as a fixed element by the operation of the third brake B3, realizing the sixth forward speed by cooperative operation of respective shafts and outputting a shifted torque to the output shaft OS connected to the second shaft TM2.

In the seventh forward speed D7, the second and third clutches C2 and C3 and the third brake B3 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the ninth shaft TM9 acts as a fixed element by the operation of the third brake B3, realizing the seventh forward speed by cooperative operation of respective shafts and outputting a shifted torque to the output shaft OS connected to the second shaft TM2.

In the eighth forward speed D8, the first, second and third clutches C1, C2, and C3 are simultaneously operated.

As a result, the first shaft TM1 and the fifth shaft TM5 are connected by the operation of the first clutch C1, and the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

As such, first, second, third and fourth planetary gear sets PG1, PG2, PG3, and PG4 integrally rotate, realizing the eighth forward speed where a torque is output as inputted and outputting a shifted torque to the output shaft OS connected to the second shaft TM2.

In the ninth forward speed D9, the second and third clutches C2 and C3 and the second brake B2 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the eighth shaft TM8 acts as a fixed element by the operation of the second brake B2, realizing the ninth forward speed by cooperative operation of respective shafts and outputting a shifted torque to the output shaft OS connected to the second shaft TM2.

In the forward tenth speed D10, the second and third clutches C2 and C3 and the first brake B1 are simultaneously operated.

As a result, the fifth shaft TM5 and the seventh shaft TM7 are connected by the operation of the second clutch C2, and the fourth shaft TM4 and the sixth shaft TM6 are connected by the operation of the third clutch C3. In the present state, the torque of the input shaft IS is input to the first shaft TM1.

In such a state, the seventh shaft TM7 acts as a fixed element by the operation of the first brake B1, realizing the forward tenth speed by cooperative operation of respective shafts and outputting a shifted torque to the output shaft OS connected to the second shaft TM2.

In the eleventh forward speed D11, the second clutch C2 and the first and second brakes B1 and B2 are simultaneously operated.

As a result, the fifth shaft TM5 and the seventh shaft TM7 are connected by the operation of the second clutch C2. In the present state, the torque of the input shaft IS is input to the first shaft TM1.

In such a state, the seventh shaft TM7 and the eighth shaft TM8 act as fixed elements by the operation of the first and second brakes B1 and B2, realizing the eleventh forward speed, which is an overdrive speed, by the cooperative operation of respective shafts and outputting a shifted torque to the output shaft OS connected to the second shaft TM2.

In the twelfth forward speed D10, the first and second clutch C1 and C2 and the first brake B1 are operated.

As a result, the first shaft TM1 and the fifth shaft TM5 are connected by the operation of the first clutch C1, and the fifth shaft TM5 and the seventh shaft TM7 are connected by the operation of the second clutch C2. In the present state, the torque of the input shaft IS is input to the first shaft TM1.

In such a state, the seventh shaft TM7 acts as a fixed element by the operation of the first brake B1, realizing the twelfth forward speed by cooperative operation of respective shafts and outputting a shifted torque to the output shaft OS connected to the second shaft TM2.

In the forward thirteenth speed D10, the first and second clutch C1 and C2 and the second brake B2 are simultaneously operated.

As a result, the first shaft TM1 and the fifth shaft TM5 are connected by the operation of the first clutch C1, and the fifth shaft TM5 and the seventh shaft TM7 are connected by the operation of the second clutch C2. In the present state, the torque of the input shaft IS is input to the first shaft TM1.

In such a state, the eighth shaft TM8 acts as a fixed element by the operation of the second brake B2, realizing the forward thirteenth speed by cooperative operation of respective shafts and outputting a shifted torque to the output shaft OS connected to the second shaft TM2.

In the forward fourteenth speed D14, the second clutch C2 and the first and third brakes B1 and B3 are simultaneously operated.

As a result, the fifth shaft TM5 and the seventh shaft TM7 are interconnected by the operation of the second clutch C2. In the present state, the torque of the input shaft IS is input to the first shaft TM1.

In such a state, the seventh shaft TM7 and the ninth shaft TM9 act as fixed elements by the operation of the first and third brakes B1 and B3, realizing the forward fourteenth speed by cooperative operation of respective shafts and outputting a shifted torque to the output shaft OS connected to the second shaft TM2.

In the reverse speed REV, the third clutch C3 and the first and third brakes B1 and B3 are simultaneously operated.

As a result, the fourth shaft TM4 and the sixth shaft TM6 are connected by the operation of the third clutch C3. In the present state, the torque of the input shaft IS is input to the first shaft TM1.

In such a state, the seventh shaft TM7 and the ninth shaft TM9 act as fixed elements by the operation of the first and third brakes B1 and B3, realizing the reverse speed by cooperative operation of respective shafts, and outputting a reverse torque through the output shaft OS connected to the second shaft TM2.

A planetary gear train according to an exemplary embodiment of the present invention may realize at least ten forward speeds one reverse speed by controlling four planetary gear sets PG1, PG2, PG3, and PG4 by three clutches C1, C2, and C3 and three brakes B1, B2, and B3.

Furthermore, a planetary gear train according to an exemplary embodiment of the present invention may improve driving stability by realizing shift-stages appropriate for rotation speed of an engine due to multi-stages of an automatic transmission.

Furthermore, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
   an input shaft receiving an engine torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, a ninth rotation element, and a tenth rotation element;
   a fourth planetary gear set having an eleventh rotation element, a twelfth rotation element, and a thirteenth rotation element;
   a first shaft fixedly connected to the second rotation element and the input shaft;
   a second shaft fixedly connected to the twelfth rotation element and the output shaft;
   a third shaft fixedly connected to the first rotation element and the seventh rotation element;
   a fourth shaft fixedly connected to the eighth rotation element;
   a fifth shaft fixedly connected to the ninth rotation element and the eleventh rotation element;
   a sixth shaft fixedly connected to the fifth rotation element and the thirteenth rotation element; and
   a plurality of shafts each selectively connecting a corresponding element to a transmission housing, the corresponding element being a rotation element of the first, second and third planetary gear sets which is not fixedly connected to one of the first to sixth shafts.

2. The planetary gear train apparatus of claim 1, wherein the plurality of shafts includes:
a seventh shaft fixedly connected to the third rotation element and selectively connectable to the transmission housing;
an eighth shaft fixedly connected to the fourth rotation element and the tenth rotation element and selectively connectable to the transmission housing; and
a ninth shaft fixedly connected to the sixth rotation element, and selectively connectable to the transmission housing,
the first shaft is selectively connectable to the fifth shaft, the fifth shaft is selectively connectable to the seventh shaft, and the fourth shaft is selectively connectable to the sixth shaft.

3. The planetary gear train apparatus of claim 2, three clutches each selectively connecting a corresponding pair among the input shaft, the output shaft, and the first to ninth shafts; and
three brakes selectively connecting the seventh shaft, the eighth shaft, and the ninth shaft to the transmission housing respectively.

4. The planetary gear train apparatus of claim 3, wherein the three clutches comprise:
a first clutch mounted between the first shaft and the fifth shaft;
a second clutch mounted between the fifth shaft and the seventh shaft; and
a third clutch mounted between the fourth shaft and the sixth shaft,
wherein the three brakes comprise:
a first brake disposed between the seventh shaft and the transmission housing;
a second brake disposed between the eighth shaft and the transmission housing; and
a third brake disposed between the ninth shaft and the transmission housing.

5. The planetary gear train apparatus of claim 1, wherein the first planetary gear set is a single pinion planetary gear set having a first sun gear, a first planet carrier, and a first ring gear as the first rotation element, the second rotation element, and the third rotation element, respectively,
the second planetary gear set is a single pinion planetary gear set having a second sun gear, a second planet carrier, and a second ring gear as the fourth rotation element, the fifth rotation element, and the sixth rotation element, respectively,
the third planetary gear set is a compound planetary gear set having a first split sun gear, a second split sun gear, a third planet carrier, and a third ring gear as the seventh rotation element, the eighth rotation element, the ninth rotation element, and the tenth rotation element, respectively, and
the fourth planetary gear set is a single pinion planetary gear set having a fourth sun gear, a fourth planet carrier, and a fourth ring gear as the eleventh rotation element, the twelfth rotation element, and the thirteenth rotation element respectively.

6. The planetary gear train apparatus of claim 1, wherein the first, second, third and fourth planetary gear sets are disposed in an order of the first, third, second, and fourth planetary gear sets from the input shaft.

7. A planetary gear train apparatus of an automatic transmission for a vehicle, comprising:
an input shaft receiving an engine torque;
an output shaft outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, a ninth rotation element, and a tenth rotation element;
a fourth planetary gear set having an eleventh rotation element, a twelfth rotation element, and a thirteenth rotation element,
wherein the first rotation element is fixedly connected to the seventh rotation element,
the second rotation element is fixedly connected to the input shaft,
the third rotation element is selectively connectable to a transmission housing,
the fourth rotation element is fixedly connected to the tenth rotation element, and selectively connectable to the transmission housing,
the fifth rotation element is fixedly connected to the thirteenth rotation element, and selectively connectable to the eighth rotation element,
the sixth rotation element is selectively connectable to the transmission housing,
the ninth rotation element is fixedly connected to the eleventh rotation element, and selectively connectable to the second rotation element and the third rotation element, respectively, and
the twelfth rotation element is fixedly connected to the output shaft.

8. The planetary gear train apparatus of claim 7, further including:
three clutches each selectively connecting a corresponding pair among the input shaft, the output shaft, and the first to thirteenth rotation elements; and
three brakes selectively connecting the third rotation element, the fourth rotation element, and the sixth rotation element to the transmission housing respectively.

9. The planetary gear train apparatus of claim 8, wherein the three clutches comprise:
a first clutch mounted between the second rotation element and the ninth rotation element;
a second clutch mounted between the third rotation element and the ninth rotation element; and
a third clutch mounted between the fifth rotation element and the eighth rotation element,
wherein the three brakes comprise:
a first brake disposed between the third rotation element and the transmission housing,
a second brake disposed between the fourth rotation element and the transmission housing; and
a third brake disposed between the sixth rotation element and the transmission housing.

10. The planetary gear train apparatus of claim 7, wherein the first planetary gear set is a single pinion planetary gear set having a first sun gear, a first planet carrier, and a first ring gear as the first rotation element, the second rotation element, and the third rotation element, respectively,
the second planetary gear set is a single pinion planetary gear set having a second sun gear, a second planet carrier, and a second ring gear as the fourth rotation element, the fifth rotation element, and the sixth rotation element, respectively, the third planetary gear set is a compound planetary gear set having a first split sun gear, a second split sun gear, a third planet carrier, and a third ring gear as the seventh rotation element, the eighth rotation element, the ninth rotation element and the tenth rotation element, respectively, and the fourth planetary gear set is a single pinion planetary gear set having a fourth sun gear, a fourth planet carrier, and a fourth ring gear as the eleventh rotation element, the twelfth rotation element, and the thirteenth rotation element, respectively.

11. The planetary gear train apparatus of claim 7, wherein the first, second, third and fourth planetary gear sets are disposed in an order of the first, third, second, and fourth planetary gear sets from the input shaft.

* * * * *